Dec. 19, 1967   G. F. LUTZ   3,358,375
GAUGE

Filed May 27, 1966   2 Sheets-Sheet 1

INVENTOR
GILBERT F. LUTZ
BY Hoffmann and Yound
ATTORNEYS

Dec. 19, 1967 G. F. LUTZ 3,358,375
GAUGE
Filed May 27, 1966 2 Sheets-Sheet 2
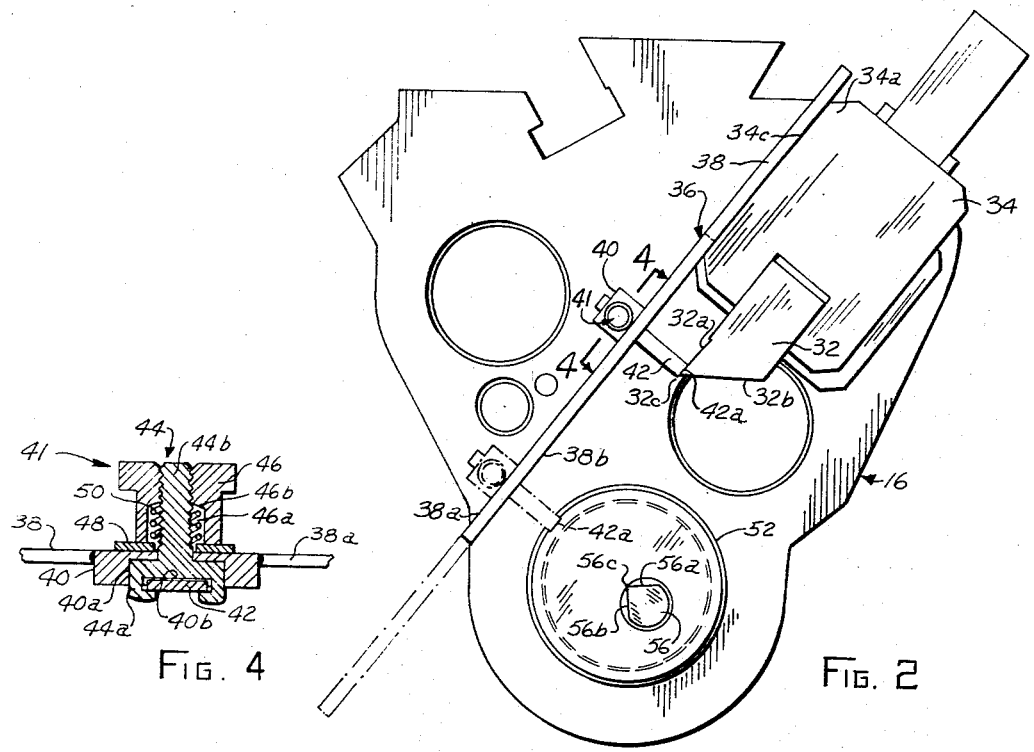
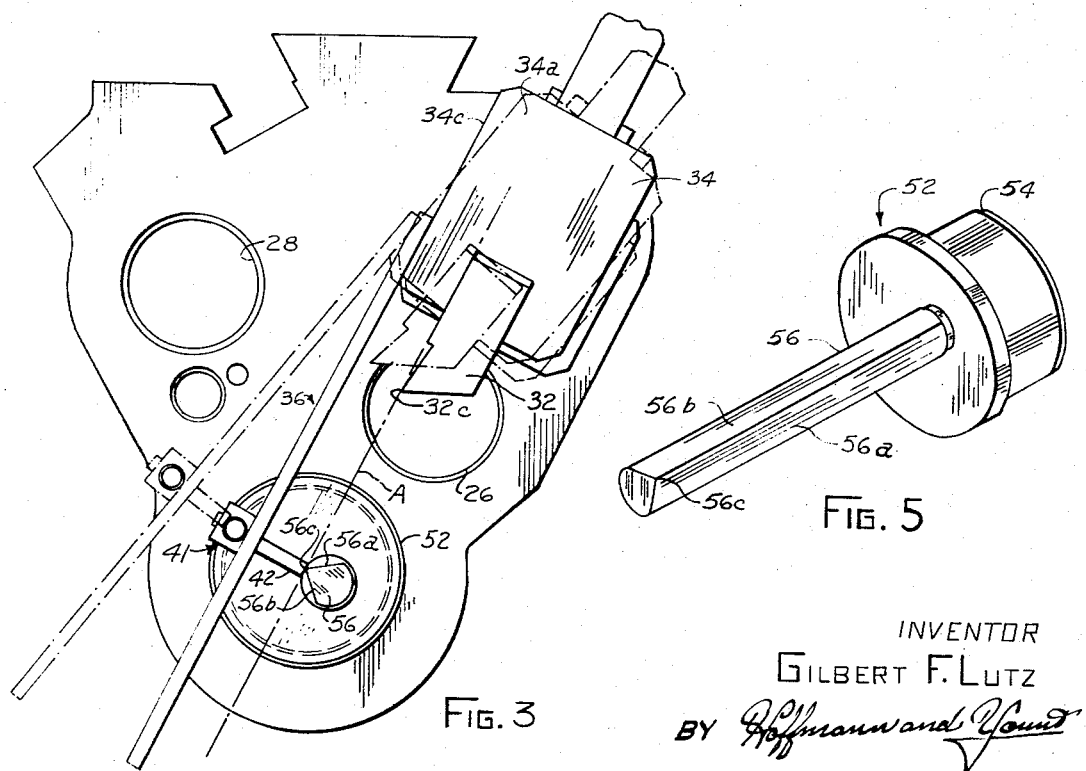
INVENTOR
GILBERT F. LUTZ
BY Hoffmann and Young
ATTORNEYS

United States Patent Office 3,358,375
Patented Dec. 19, 1967

3,358,375
GAUGE
Gilbert F. Lutz, Chesterland, Ohio, assignor to The Warner & Swasey Company, Cleveland, Ohio, a corporation of Ohio
Filed May 27, 1966, Ser. No. 553,465
14 Claims. (Cl. 33—185)

The present invention relates to apparatus for use in positioning the cutting edge of a machine tool turning cutter on a radial line extending through the axis of rotation of the workpiece to be cut, and in particular relates to a setup gauge for so positioning the cutting edge of a turning cutter supported by a cutter holder which in turn is supported by a tool holder secured to a part of the machine tool.

The principal object of the present invention is to provide a new and improved apparatus for use in positioning the cutting edge of a turning cutter on a radial line extending through the axis of rotation of a workpiece and which apparatus is simple in design, easily used, permits rapid positioning of the cutter, and can be readily adjusted so as to be useful with various types and sizes of cutters and cutter holders.

A further object of the present invention is to provide a new and improved apparatus for use in positioning the cutting edge of a turning cutter on a radial line extending through the axis of rotation of a workpiece and which includes a gauging member which is supported by an elongated supporting member and wherein the gauging member extends from the elongated member a distance equal to the distance between the cutting edge and a reference portion of the cutter holder, so that when the elongated member of the gauge engages the reference portion of the cutter holder and the gauging member engages a reference part located on the axis of the workpiece, the cutting edge of the cutter is properly positioned on the radial line.

A still further object of the present invention is the provision of a new and improved apparatus for use in positioning the cutting edge of a turning cutter on a radial line extending through the axis of rotation of a workpiece, as noted in the next preceding object, wherein the gauging member is supported on the elongated member by a support member secured to the elongated member and to which the gauging member is adjustably secured, and wherein the gauging member is biased into frictional engagement with the elongated member to maintain the parts assembled and facilitate adjustment of the gauging member.

Another object of the present invention is the provision of a new and improved apparatus for use in positioning the cutting edge of a turning cutter on a radial line extending through the axis of rotation of a workpiece wherein the apparatus includes an adjustable gauge and a workpiece axis indicating member which has an edge portion supported in axial alignment with the axis of rotation of the workpiece, the gauge having a base portion positioned in engagement with a reference surface of the cutter holder for the cutter and has a slide member which is adjusted to project a distance equal to the distance between the cutting edge of the cutter and the reference surface of the cutter holder whereby positioning the gauge so that the adjusted slide member contacts the edge of the center indicating mechanism while the gauge base portion engages the reference surface effects positioning of the cutting edge on the radial line.

Other objects and advantages of the present invention will become apparent from the following description of the preferred embodiment of the present invention made with reference to the accompanying drawings and in which:

FIG. 2 is an elevational view of a tool holder shown in FIG. 1 and illustrating a gauge for positioning the cutter supported by the tool holder;

FIG. 3 is a view similar to FIG. 2 but showing the parts in different positions;

FIG. 4 is a sectional plan view of a portion of the gauge shown in FIG. 2 taken approximately along section line 4—4 thereof;

FIG. 5 is a perspective view of a portion of the apparatus shown in FIG. 2; and

Figure 1:
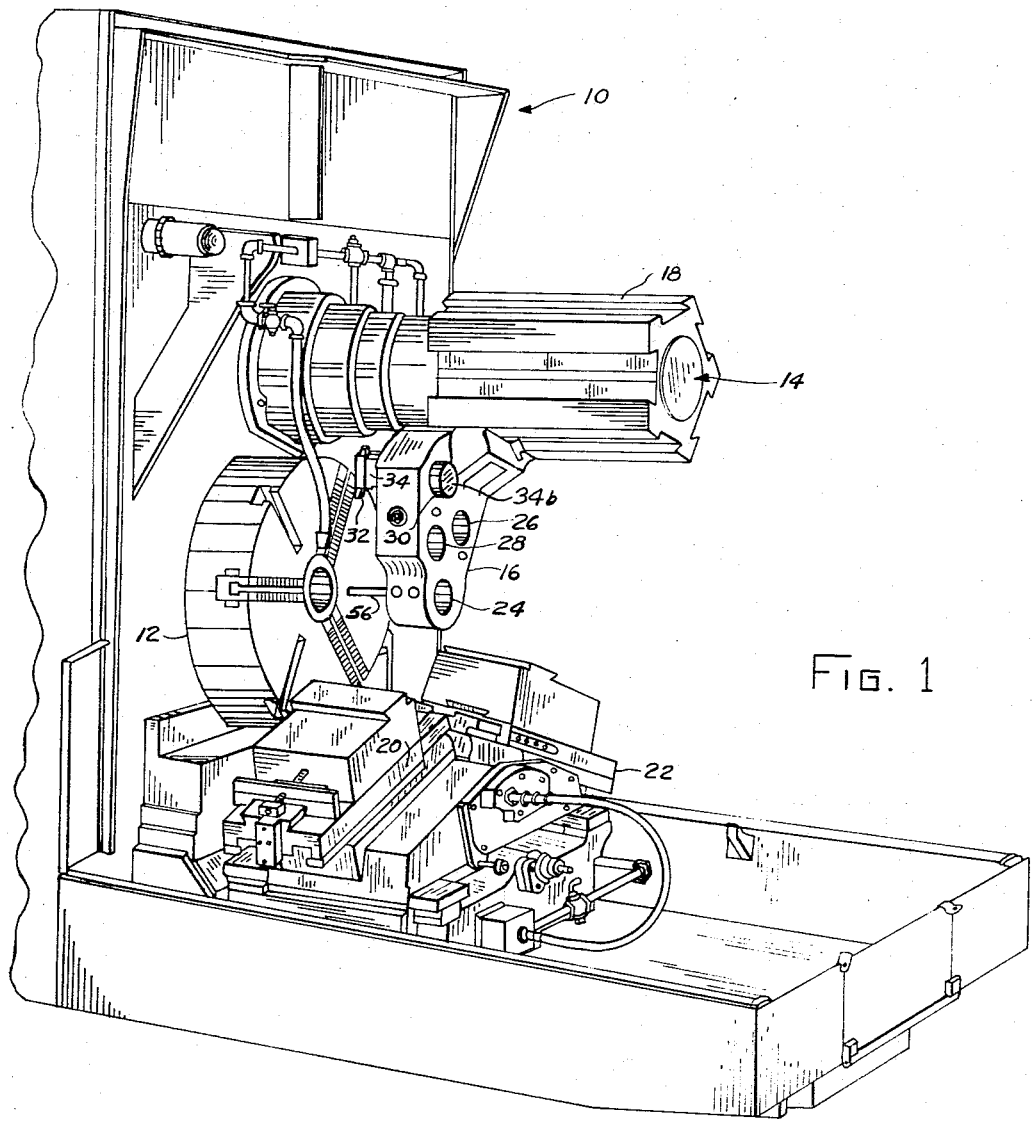
FIG. 1 is a perspective view of a machine tool with which the apparatus of the present invention is utilized.

The present invention provides an apparatus for use in the setup of a machine tool, and specifically for positioning cutters used in the machine tool. The apparatus is specifically used to position the cutting edge of a cutter on a radial line extending through the axis of rotation of the workpiece, and more specifically for "centering" the cutter as it is commonly referred to in the art, and so referred to hereinbelow. The apparatus of the present invention is useful in positioning cutters for use in different machine tools but will be described hereinafter for use in positioning turning cutters of an automatic lathe 10.

The lathe 10 includes a spindle which carries a chuck 12. The chuck 12 supports the workpiece for rotation with the spindle. Usually several machining operations are performed on the workpiece by different tools which are moved into engagement with the rotating workpiece in proper sequence. The tools are supported by a turret 14 which includes five tool supporting surfaces 18. One tool holder 16 is illustrated in the drawings and shown positioned on the turret 14. The turret 14 is indexed to present the tool holders in a selected sequence to the workpiece and is moved axially to move the tools supported by the tool holder into engagement with the workpiece and along the axis of the workpiece as it is being machined.

The tool holder 16 can support a plurality of tools for performing machining operations on the workpiece. A pair of cross slides 20 and 22 are supported to move toward and away from the workpiece and carry appropriate tools for performing other machining operations on the workpiece and in addition to the machining operations performed by the tools supported in tool holder 16.

The tool holder 16 includes a plurality of cutter holder receiving openings 24, 26, 28, 30. The opening 24 is aligned axially with the workpiece and generally carries a tool for performing some work in the interior of the workpiece such as a drill or boring tool. Openings 26, 28 and 30 generally support tools which machine the exterior surface of the workpiece and are offset and staggered so that different types of tools depending upon the size of the workpiece and the work to be performed thereby can be selectively positioned in these openings to be positioned in proper relationship to the workpiece.

The tool holder as shown in FIGS. 1, 2 and 3 supports an overhead turning cutter 32. Cutter 32 engages the periphery of the rotating workpiece and is supported in the opening 30 by a cutter holder 34. Cutter holder 34 comprises a head 34a which is generally rectangular and a stem 34b (FIG. 1) which is of generally cylindrical configuration. The cutter holder 34 is supported by the tool holder 16, and specifically the shank 34b is located in opening 30 in the tool holder 16. The cutter 32 is positioned in the head 34a and secured therein against relative movement.

In accordance with the present invention a gauging apparatus is used to align or "center" the cutter with respect to the axis of rotation of the workpiece so that the cutter properly engages the workpiece to produce the appropriate cut. The cutter 32 includes surfaces 32a, 32b which are inclined relative to each other and define a cutting edge 32c at their intersection. The cutter also includes a locating surface 32d (FIG 6) commonly referred to as a "grinding" locating surface. The grinding locating surface is the surface from which most measurements of the cutter are made. When the cutter is located in the cutter head 34a, the surface 32d engages a side surface defining the slot in the head which receives the cutter. This surface 32d then lies substantially parallel to a reference surface 34c on the head 34.

Figure 6:
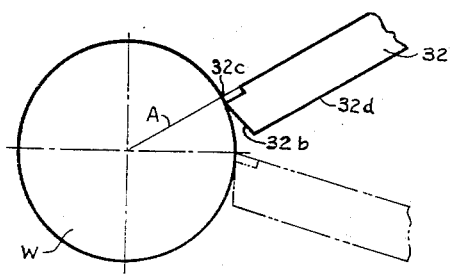
FIG. 6 is a schematic view illustrating a cutter and workpiece.

The gauging apparatus is used to "center" the cutter 32 and specifically to position the cutting edge 32c on a radial line through the center of the workpiece and designated A in FIG. 3. The cutter 32 is on "center" when the radius from the center of the workpiece W (FIG. 6) to the tip of the cutter is parallel to the grinding locating surface 32d. Such a radius is designated A in the drawings. FIG. 6, in full lines, shows the cutter 32 centered, while in dotted lines the cutter is not on center. When the cutting edge is so aligned, the cutter will make the prescribed depth of cut in the workpiece without substantial chatter and with the forces being transmitted to the tool holder 16 properly. Improper tool alignment can also accelerate wear on the cutter tool.

The gauging apparatus comprises a gauge 36 and a workpiece axis indicating member 52, shown in FIG. 5, which cooperate to "center" the cutting edge 32c of the cutter tool. The gauge 36 comprises an elongated base member 38 of generally rectangular cross section. The base member 38 has a support or bearing block 40 suitably secured thereof, such as by welding, and which projects upwardly and outwardly from a side 38a of the base member 38. The block 40 supports a gauging member or slide 42 which projects perpendicularly to the underside 38b of the base member 38.

The gauging member 42 is slidable relative to the block 40 and can be adjustably secured thereto to project a predetermined distance from surface 38b of the base member 38. Locking means 41 are provided for locking the gauging member 42 to the block 40. The locking means 41 comprises a locking or clamping member 44 which extends through the block and is seated in a recess 40a provided in block 40 and is secured to the block by a nut 46. The locking member 44 has a head portion 44a and a connected threaded shank 44b. The head 44a surrounds a substantial part of the periphery of the slide member 42 and clamps the slide to block 40. The threaded shank 44b is connected to the head 44a and projects beyond the side of the block 40 opposite the side engaging the slide and has nut 46 threaded thereon. A washer 48 is disposed between the inner end of nut 46 and one side of block 40. The nut 46 holds the locking member in assembled relationship in the block 40 and positions the locking member in clamped engagement with the slide 42. Rotation of nut 46 effects movement thereof along stem 44 toward the block 40 drawing the head 44a of the locking member 44 into tight seating engagement in block recess 40a and locks the slide 42 to the block 40. The nut is rotated in the opposite direction to unlock the slide so that it can be adjusted.

The locking means 41 is biased into clamping engagement with the slide during slide adjustment by a coil spring 50. The locking means 41 is biased to exert pressure on the slide when the nut unlocks the slide to facilitate adjustment of the slide. The spring 50 surrounds shank 44b and is positioned in a hollow or recess portion 46a in nut 46. The spring acts between an abutment 46b on the nut 46 and the washer 48 and biases the head 44a into the recess 40a which moves the slide 42 into frictional engagement with the engaging or bearing face 40b of block 40. The biasing effect of the locking means can be varied by adjusting the nut 46 along shank 44b.

The gauge is used to center the cutter 32 by laying the planar side 38b of the base member 38 along a side 34c of the head 34a of the cutter holder 34. The side 34c across which the base member is laid is a reference surface for the gauging operation. The nut 46 is rotated to move away from the block to unlock the slide 42. Unlocking the slide permits the slide 42 to be moved relative to the block 40 until a depending end surface 42a thereof engages the cutting edge 32c of the cutter 32. When the depending end 42a of the slide 42 is in engagement with the cutting edge 32c of the cutter, the nut 46 is turned toward the block to lock the slide in this position. When in this adjusted position, the depending end 42a of the gauging member 42 projects from the planar surface 38b of the base 38 a distance corresponding to the distance between the cutting edge 32c of the cutter 32 and the reference surface 34c of the cutter holder 34. The gauge 36 is then moved along the cutter holder until the end 42a of slide 42 is opposite the workpiece center indicating device 52.

The workpiece center indicating device 52 is inserted in the cutter holder receiving opening 24 in the tool holder 16 which opening is aligned with the axis of the work supporting spindle. The indicating device 52 comprises a tubular portion 54 adapted to extend into opening 24 and is snugly received therein. A stem portion 56 projects axially from body 54. The stem portion 56 has a pair of inclined sides 56a and 56b which intersect and form a reference edge 56c which is axially aligned with the axis of rotation of the workpiece supporting spindle and consequently with the axis of rotation of the workpiece.

The gauge 36 is moved to the phantom line position illustrated in FIGS. 2 and 3 wherein the slide 42 is opposite the indicating device 52 and the base surface 38a is held in engagement with the side 34c of the cutter holder 34. The cutter holder 34 is rotated in opening 30 until the depending end 42a of slide 42 abuts or contacts the reference edge 56c of stem 56. When the slide 42 contacts edge 56c, the cutting edge 32c of the cutter 32 is "centered" or aligned with the axis of the workpiece. The cutter holder 34 is thus properly positioned and is secured in this position of adjustment by any suitable means which prevents the cutter holder 34 from turning in opening 30 during the cutting operation.

It should be apparent from the foregoing that the present invention provides a new and improved "centering" gauge which is relatively simple in construction and permits quick and accurate alignment of the cutting edge of an overhead turning cutter with the axis of the workpiece so that the proper depth of cut can be made by the cutter without problems created by the cutter not being "centered" properly. Although the preferred embodiment of the present invention has been described in considerable detail, it is intended to cover all changes and modifications thereof which come within the scope of the appended claims.

Having described my invention, I claim:

1. An apparatus for use in positioning the cutting edge of a cutter supported by a cutter holder on a radial line extending through the axis of rotation of a workpiece comprising an elongated member having a substantially planar surface portion adapted to engage a first reference surface on the cutter holder, a member having a reference portion arranged on the axis of the workpiece, and a gauging member supported on said elongated member to project outwardly thereof, said gauging member having an end surface spaced from said planar surface portion of said elongated member a distance equal to the distance between the first reference surface of the cutter holder and the cutting edge of the cutter and movable into a position where said end surface engages said reference portion while said planar surface engages said first reference surface whereby said cutting edge of the cutter is located on said radial line.

2. The apparatus as defined in claim 1 wherein said gauging member includes an elongated slide arranged transversely of said elongated member and having said end surface at one end thereof, means adjustably supporting said slide on said elongated member to vary the distance between said end surface of said slide and said planar surface of said elongated member to correspond to variations in the distance between the first reference surface of the cutter holder and the cutting edge of the cutter.

3. The apparatus as defined in claim 2 further including means for locking said slide in a selected position of adjustment and releasable to permit adjustment of said slide relative to said elongated member.

4. The apparatus as defined in claim 3 further including spring means for biasing said means for locking said slide into engagement with said slide.

5. The apparatus as defined in claim 1 further including a support block secured to said elongated member and having a bearing surface, said gauge member including a slide member arranged to engage said bearing surface, a clamp mounted in said support block and arranged to move said slide into engagement with said bearing surface, said clamp having a first portion surrounding a portion of the periphery of said slide and a second portion extending through said block and having threads on the end thereof, a nut threaded on said threaded second portion and adjustable therealong to effect clamping and unclamping of said slide member to said block.

6. The apparatus defined in claim 5 further including spring means arranged to act between said nut and said block to bias said clamp and the engaged slide into engagement with said bearing surface, and means for adjusting the biasing effect of said spring means to vary the frictional engagement between said slide and said block.

7. The apparatus as defined in claim 1 wherein said reference portion is provided by a workpiece axis indicating member having a generally cylindrically shaped portion and a stem portion projecting axially from said cylindrically shaped portion and having inclined sides which intersect to define said reference portion.

8. An apparatus for use in positioning the cutting edge of a cutter supported by a cutter holder on a radial line extending through the axis of rotation of the workpiece comprising an elongated member having a substantially planar surface portion along one side, a support member secured to said elongated member and having a bearing surface, an elongated slide arranged adjacent said bearing surface and extending transversely of said planar surface of said elongated member, locking means for locking said slide against movement relative to said support member in a selected position of adjustment and releasable to permit adjustment of said slide, and means biasing said slide into engagement with said bearing surface when said locking means is released.

9. The apparatus defined in claim 8 wherein said locking means includes a clamping member supported on said support member and surrounding a portion of the periphery of said slide, said clamping member having a threaded portion the end of which projects beyond said support member, a nut threadedly received on said threaded portion of said clamping member and adjustable thereon to lock the said slide to said support member.

10. The apparatus defined in claim 9 wherein said means biasing said slide comprises a spring arranged to act between said nut and said support member to cause said clamping member to move said slide into frictional engagement with said bearing surface of said support member.

11. An apparatus for use in positioning the cutting edge of a cutter supported by a cutter holder on a radial line extending through the axis of rotation of the workpiece comprising a tool holder having a plurality of openings therein adapted to receive and support a cutter holder carrying said cutter, one of said openings being axially alignable with the workpiece, a workpiece axis indicating member disposed in said one opening and having an edge axially aligned with the axis of the workpiece, a cutter holder supported in another of said openings and carrying said cutter, said cutter holder having a gauge reference surface, and a gauge including an elongated base member having a substantially planar surface portion adapted to engage said gauge reference surface on said cutter holder, a gauge member supported on said base member to project outwardly thereof and having an end surface spaced from said surface portion of said base member a distance equal to the distance between said gauge reference surface and said cutter, said end surface adapted to engage said edge of said workpiece axis indicating member when said gauge reference surface and said edge are spaced said distance whereby the cutting edge is located on said radial line.

12. The apparatus defined in claim 11 wherein said workpiece axis indicating member comprises a generally cylindrically shaped portion adapted to enter said one opening and a stem portion extending axially from said cylindrically shaped portion, said stem portion having two inclined sides which intersect to form said edge.

13. The apparatus as defined in claim 11 wherein said gauge member comprises a support member carried by said base member and having a bearing surface, a slide arranged adjacent said bearing surface, locking means for locking said slide against movement relative to said base member in a selected position of adjustment and releasable to permit adjustment of the slide.

14. The apparatus defined in claim 11 wherein said cutter has a grinding locating surface and said radial line lies parallel to said grinding locating surface when said cutter is properly positioned.

References Cited

UNITED STATES PATENTS

| | | | |
|---|---|---|---|
| 2,028,134 | 1/1936 | Brubaker | 82—34 |
| 2,397,795 | 4/1946 | Lersch | 33—185 |
| 2,814,885 | 12/1957 | Johns | 33—185 |

LEONIDAS VLACHOS, *Primary Examiner.*